United States Patent [19]

Hellgren

[11] 4,080,139

[45] Mar. 21, 1978

[54] HYDRAULIC PRESS

[75] Inventor: Keijo Hellgren, Vasteras, Sweden

[73] Assignee: ASEA AB, Vasteras, Sweden

[21] Appl. No.: 752,280

[22] Filed: Dec. 20, 1976

[30] Foreign Application Priority Data

Dec. 23, 1975 Sweden ............................... 7514606

[51] Int. Cl.[2] ............................................ B29C 17/04

[52] U.S. Cl. ................................ 425/389; 425/405 R; 425/19; 72/63

[58] Field of Search ....... 425/389, 394, 405, DIG. 19, 425/DIG. 44, DIG. 112; 72/63; 264/314

[56] References Cited

U.S. PATENT DOCUMENTS

| | | | |
|---|---|---|---|
| 2,771,850 | 11/1956 | Wheelon | 72/63 |
| 2,923,130 | 2/1960 | Wheelon | 425/DIG. 19 |
| 3,006,306 | 10/1961 | Pfeiffer et al. | 425/DIG. 19 |
| 3,545,241 | 12/1970 | Grankowski et al. | 425/389 X |
| 3,614,811 | 10/1971 | Johnson | 425/389 |
| 3,888,618 | 6/1975 | Jones | 425/389 |

*Primary Examiner*—Robert L. Spicer, Jr.

*Attorney, Agent, or Firm*—Watson, Cole, Grindle & Watson

[57] ABSTRACT

A press for molding large sheets around a forming surface which includes an elastic press pad, a first frame member on the side of the press pad away from the working surface thereof, a pressure cell formed between the press pad and the first frame member, the pressure cell containing an elastic diaphragm in contact with the press pad, a second frame member formed in a generally L-shaped configuration to encompass and hold an annular bead of the elastic diaphragm, mounting bolts for adjusting the positioning of the second frame member with respect to the first frame member, and channels in the first frame member for supplying a pressure medium to a pressure zone between the first and second frame members and the elastic diaphragm. In addition, the annular bead of the diaphragm is provided with a slot that contains a sealing ring, and the first frame member may be separated from contact with the second frame member by spacers to allow for pressure medium communication between the slot and the pressure medium zone between the first and second frame members and the elastic diaphragm.

9 Claims, 5 Drawing Figures

HYDRAULIC PRESS

BACKGROUND OF THE INVENTION

1. Field of the Invention

The present invention relates to hydraulic presses that have very large working surfaces for pressing and forming sheets which are resting on a forming tool. More specifically, the present invention relates to the mechanism used for applying the compressive force to an elastic forming pad which then acts to press the sheets against the forming tool.

2. Description of the Prior Art

In hitherto known presses, very large working surfaces have been utilized to form or mold sheets of various materials on a suitable forming tool. This forming has been achieved by pressing the sheets against the forming tools by means of a forming pad of elastic material. The compressive force is achieved by use of a pressure medium which is pumped into a pressure cell with a bag-like diaphragm located above the forming pad. The diaphragm is formed with an annular bead around an opening and is secured between two disc-shaped attachment members which form an annular slot fitting the bead. The pressure medium space in the pressure cell is then defined by the inner surface of the diaphragm and the lower surface of the attachment member which is located inside the bag-like diaphragm.

Normally the diaphragm and one of the disc-like attachment members have made up one single unit, which is due to the fact that the diaphragm is made of such stiff material that a finished diaphragm cannot be fittd onto the attachment member, and the fact that the bead of the diaphragm has been attached to the attachment member by gluing or vulcanization. Also, in currently known presses, it has been considered absolutely necessary to prevent pressure medium from penetrating in between the attachment members and effect harmful forces, for example, forces tending to remove the attachment members from each other and create unallowable tensile forces in the bolts which hold the attachment members together.

The fact that a diaphragm and a disc-formed attachment member constitute an inseparable unit has several drawbacks. In large presses, for example, with a working surface of 1.5 × 5 meters, the disc-formed attachment member has a great weight and involves considerable cost. A spare diaphragm is therefore expensive. Further, the high weight of a spare diaphragm means high transport costs for transporting a diaphragm from a manufacturer and for returning an attachment disc to a diaphragm manufacturer. Particularly in case of damage, when it is desirable to obtain a spare diaphragm rapidly and aircraft transport is desirable, the high weight is a considerable drawback.

The purpose of the present invention is to reduce the above-mentioned drawbacks so that the costs of diaphragms are reduced and transport and handling of diaphragms are facilitated.

SUMMARY OF THE INVENTION

In accordance with the present invention, one attachment member is formed as a frame with an outer part adjusted to the bead and opening of the diaphragm. The weight and the cost are reduced considerably. In a preferred embodiment the frame is divided in such a way that it can be inserted into a diaphragm in connection with this being mounted in the press to replace a used diaphragm. The same frame can then be used as has been used in the previous diaphragm. The frame may, for example, consist of four corner portions and four straight frame portions therebetween. To prevent the creation of harmful pressure medium inclusions when the pressure is reduced in the pressure cell, it is desired that slots for an elastomeric sealing ring, which is used to prevent pressure medium from forcing out of the pressure cell, will communicate with the pressure medium-filled space of the pressure cell. This communication is suitably achieved by placing spacers around the bolts which secure the frame or frame parts to another attachment member, so that a gap is obtained between the frame and this second attachment member. This spacing element and a surrounding sealing ring, which prevents pressure medium from forcing its way out at the bolts, are suitably arranged in a depression in the frame so that a suitable slot for the sealing ring is obtained. Inside the attachment frame there may be arranged a filling body, which may have the double function of taking up inwardly-directed forces acting on the frame and reducing the amount of pressure medium contained in the pressure cell.

DETAILED DESCRIPTION OF PREFERRED EMBODIMENT

Figure 1:
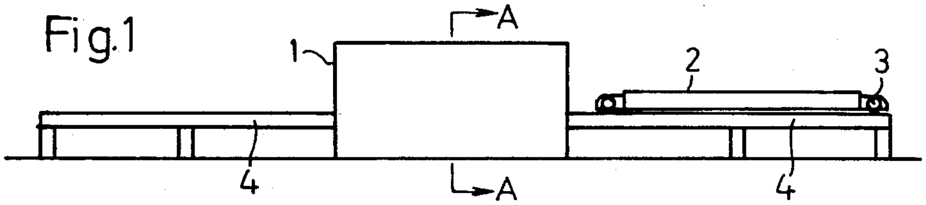
FIG. 1 shows a side view of a typical press facility.
Figure 2:
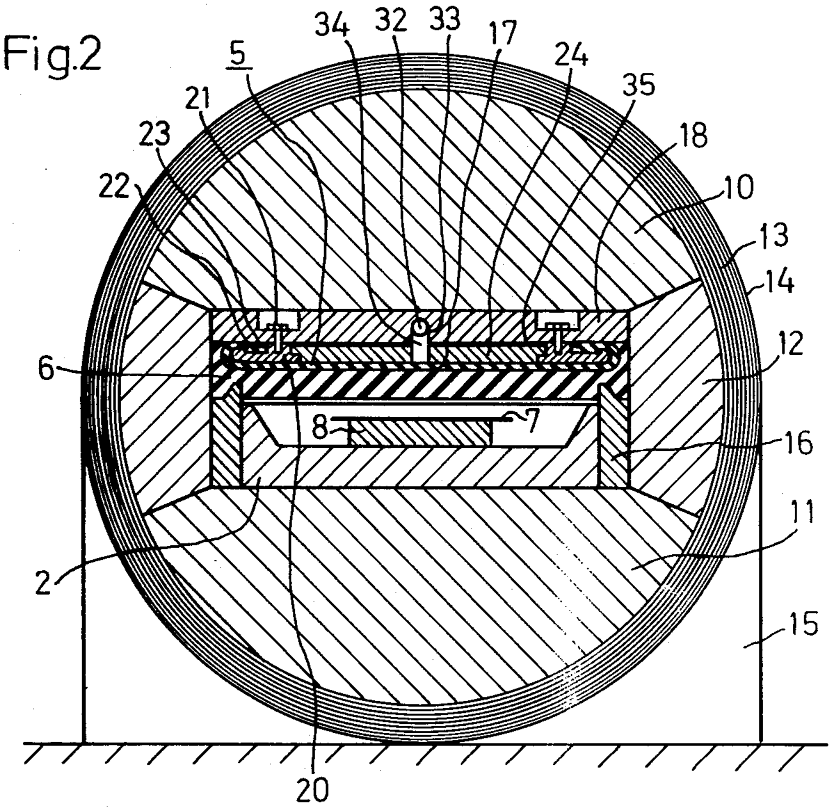
FIG. 2 shows a section through the press along A—A of FIG. 1 when the press is in accordance with the present invention.

Referring to the Figures, 1 designates a press and 2 a trough-shaped supporting member in which there are placed tools and workpieces. The supporting member is provided with supporting rollers 3 running on tracks 4. The supporting member is displaceable between the position shown in FIG. 1, where pressed sheets are removed and new sheets are placed on forms, and a position inside the press below a pressure cell 5 located in the press and an elastic forming pad 6 influenced by the pressure cell, the forming pad forming the sheets 7 on the forming tool 8. The shown press is of the kind which is built up from an upper yoke 10, a lower yoke 11, two intermediate spacers 12 and a strip sheath 13 holding these items together. The strip sheath is surrounded by a protective plate 14. The press rests on a support 15 having bearing surfaces shaped to suit the shape of the press stand. The yokes 10, 11 and the spacers 12 form a space with substantially rectangular cross-section. At the upper part of this space the pressure cell 5 and the forming pad 6 are arranged. At the long sides of the space there are supporting bars 16 supporting the diaphragm 6 and the pressure cell 5. The pressure cell is composed of a bag-like diaphragm 17, an attachment member 18, shaped as a disc, and an attachment frame 20 which is attached to the disc 18 by a number of bolts 21. Between the bead 22 of the diaphragm 17 and the disc 18 there is a sealing ring 23 intended to prevent pressure medium from forcing its way out between the bead 22 and the disc 18. Inside the frame 20 there may be a filling body 24.

Figure 3:
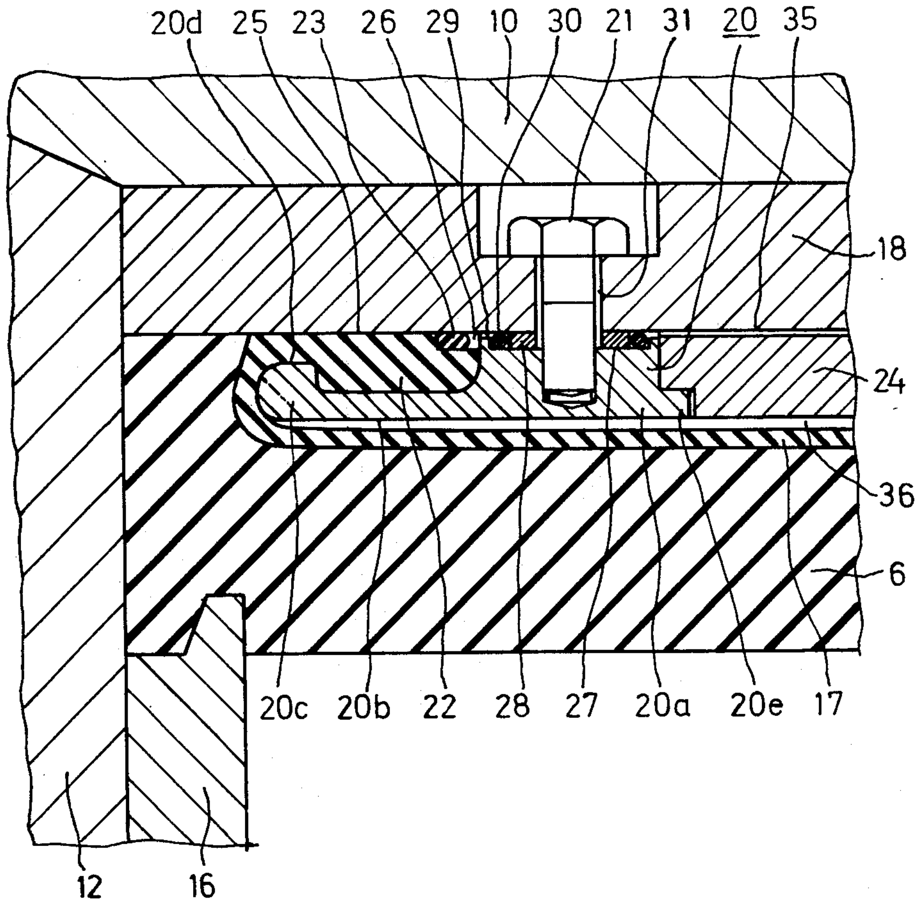
FIG. 3 shows, on an enlarged scale, a section at the attachment of the diaphragm of the pressure cell in accordance with the present invention.
Figure 4:
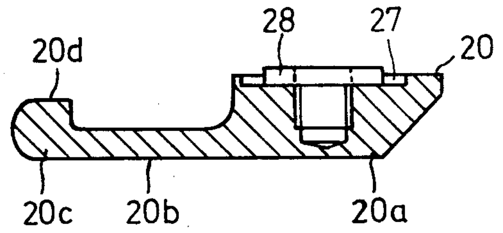
FIG. 4 shows a section through an alternative embodiment of the attachment frame according to the present invention.

As is best illustrated in FIGS. 3 and 4, the frame 20 is made with a thicker inner portion 20*a*, a thinner intermediate portion 20*b* and an outer portion 20*c* with a projecting flange 20*d* to form a generally L-shaped configuration. The frame 20 forms together with the disc 24 an annular slot which is adjusted to the cross-section of the bead 22. In the embodiment according to FIG. 3 the frame 20 is formed with a flange 20*e* forming a support for the filling disc 24. In the bead 22 there is an annular recess which, together with the disc 18 and the frame 20, forms an annular slot 26 for the sealing ring 23. In bored recesses 27 in the frame 20 there are placed spacers 28 with somewhat greater thicknesses than the depth of the recess so that a gap 29 is formed between the upper side of the frame 20 and the disc 18. In an annular slot formed between the disc 18 and the frame 20 and outside the plate 28 there is an O-ring seal 30 which prevents pressure medium in the pressure cell from entering into the hole 31 for the bolt 21. The pressure cell 5 is supplied with pressure medium through the axial channel 32 and the opening 33 as well as the hole 34 in the filling disc 24. The pressure medium thus has free access to the gap 35 between the disc 24 and the disc 18 and the gap 29 between the frame 20 and the disc 18. In the frame portion 20*b* there are draining channels or draining holes preventing pressure medium from being enclosed between the bead 22 and the frame 20. Through hole 34 in the disc 24 pressure medium may reach gap 36 between diaphragm 17 and disc 24, in the embodiment according to FIG. 3. In an embodiment of the frame according to FIG. 4, i.e., when no filling disc is used, pressure medium is supplied to a space between disc 18 and diaphragm 17.

Figure 5:
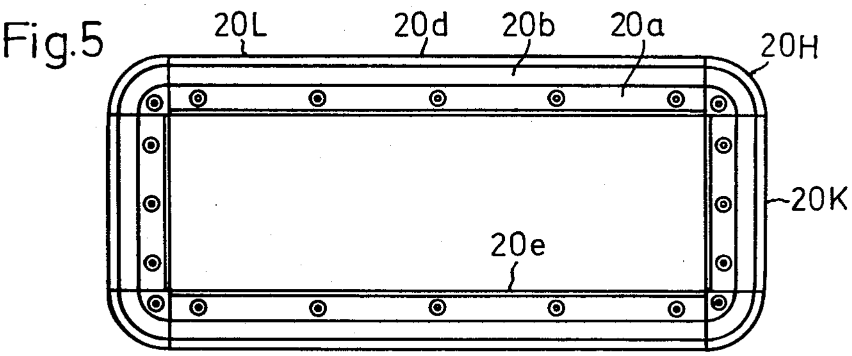
FIG. 5 shows a view of an attachment frame according to FIG. 3.

In a preferred embodiment, shown in FIG. 5, the frame 20 consists of four corner portions 20H, two straight short sides 20K and two straight long sides 20L. The division of the frame is the most advantageous one, but also other divisions are possible.

While there has been shown and described what is considered to be preferred embodiments of the present invention, it will be obvious to those skilled in the art that various changes and modifications may be made therein without departing from the invention as defined in the appended claims.

I claim:

1. In a hydraulic press which includes wall means forming a press space therebetween, a first attachment means positioned within said space, an elastic press pad supported against said first attachment means having a recess therein forming a pressure cell therebetween, a second attachment means mounted within said pressure cell, a bag-like elastic diaphragm positioned in said pressure cell between said second attachment means and said press pad and having an annular bead which fills an annular slot formed between said annular bead and at least one of said first and second attachment means, said press pad being elastic and capable of movement for pressing a sheet which is placed adjacent thereto and on a suitable forming tool, the improvement wherein the second attachment means is in the form of an annular frame which has the same shape as the bead of the bag-like diaphragm, wherein a plurality of mounting bolts are positioned to connect said second attachment means and said first attachment means in an adjustable manner, and wherein annular spacers are positioned around each of the plurality of mounting bolts between said first and second attachment means to form a gap therebetween, said gap allowing fluid communication between said slot formed between the annular bead of said bag-like elastic diaphragm and at least one of the first and second attachment means and a pressure medium zone formed between said diaphragm and said first and second attachment means.

2. The press of claim 1, wherein said second attachment means is rectangular in shape and is composed of multiple members attached together with a space formed therebetween.

3. The press of claim 2, wherein said multiple members include four straight side members and four corner members.

4. The press of claim 1, wherein said second attachment means has holes bored in the surface thereof adjacent said first attachment means and around each said mounting bolt, wherein one spacer is arranged around each bolt within each bored hole, and wherein an O-ring seal means is also placed around each bolt within each bored hole.

5. The press of claim 1, wherein said second attachment means is in a generally L-shaped configuration in cross section.

6. The press of claim 1, wherein said first attachment means is provided with means for supplying a pressure medium to said pressure medium zone.

7. The press of claim 1, wherein said press pad and first attachment means are supported within the press area and at an upper portion thereof by means of supporting bars.

8. The press of claim 1, wherein a disc-shaped filling means is located between the first attachment means and the diaphragm means, and annularly inwardly of the second attachment means; said disc-shaped filling means functioning to reduce the amount of pressure medium needed within the pressure cell and to resist forces acting on the first attachment means.

9. The press of claim 8, wherein said first attachment means is provided with means for supplying a pressure medium to the zone formed between the first attachment means and the disc-shaped filling means, and wherein the disc-shaped filling means is provided with means for conveying the pressure medium to the zone between the disc-shaped filling means and the diaphragm.

* * * * *